(12) United States Patent
Qaudeer et al.

(10) Patent No.: US 11,151,621 B2
(45) Date of Patent: Oct. 19, 2021

(54) SYSTEM AND METHOD FOR CARRIER SETTLEMENT USING BLOCKCHAIN

(71) Applicant: Verizon Patent and Licensing Inc., Arlington, VA (US)

(72) Inventors: Mohammed A. Qaudeer, Tampa, FL (US); Abdul Raheem, Irving, TX (US); Jason Trask, Jenks, OK (US); Jagannath K. Rangarajan, Irving, TX (US); Charles G. Wasserott, Owasso, OK (US); Ahmed A. Khan, Plano, TX (US); Rasmi Samal Ranjan, Hyderabad (IN); Dawood A. Syed, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 16/451,669

(22) Filed: Jun. 25, 2019

(65) Prior Publication Data

US 2020/0410559 A1    Dec. 31, 2020

(51) Int. Cl.
*G06Q 30/04*     (2012.01)
*H04M 15/00*     (2006.01)
*H04W 4/24*      (2018.01)
*H04L 29/08*     (2006.01)

(52) U.S. Cl.
CPC .......... *G06Q 30/04* (2013.01); *H04M 15/51* (2013.01); *H04W 4/24* (2013.01); *H04L 67/10* (2013.01)

(58) Field of Classification Search
CPC ...... H04M 15/50; H04M 15/00; H04M 15/47; H04M 15/41; H04M 15/73; H04M 15/51; G06Q 30/04; H04L 67/10; H04W 4/24

USPC .......................................................... 705/34
See application file for complete search history.

(56) References Cited

U.S. PATENT DOCUMENTS

| | | | |
|---|---|---|---|
| 9,137,387 B2* | 9/2015 | Bouchard | H04M 15/52 |
| 9,351,148 B2* | 5/2016 | Sparks | H04W 8/10 |
| 10,755,226 B1* | 8/2020 | Robyak | G06K 7/10366 |
| 10,812,570 B1* | 10/2020 | Wu | H04L 67/10 |
| 10,891,694 B1* | 1/2021 | Leise | H04L 9/0825 |
| 10,917,793 B2* | 2/2021 | Malik | H04L 9/0643 |
| 2017/0250877 A1* | 8/2017 | Seyvet | H04L 41/5019 |
| 2018/0060926 A1* | 3/2018 | Guadagno | G06Q 30/04 |
| 2018/0101914 A1* | 4/2018 | Samuel | G06Q 20/102 |
| 2018/0130050 A1* | 5/2018 | Taylor | H04L 9/3247 |
| 2018/0191714 A1* | 7/2018 | Jentzsch | H04L 63/126 |
| 2018/0255130 A1* | 9/2018 | Kozloski | H04L 67/22 |

(Continued)

*Primary Examiner* — Andrew Joseph Rudy

(57) ABSTRACT

A framework is provided for blockchain-based customer dispute management of wholesale telecommunications claims. A network device receives a telecommunication claim to dispute an invoice from a provider network. The provider network and a partner network that includes the network device are related through a wholesale telecommunications agreement. The network device validates the telecommunication claim based on information in a distributed ledger of the distributed consensus network. The distributed ledger includes transaction information generated by the provider network for the partner network under the wholesale telecommunications agreement. The network device adjudicates the telecommunication claim based on information in the distributed ledger and instructions in a contract and updates the distributed ledger with the adjudicated claim.

20 Claims, 11 Drawing Sheets

(56) References Cited

U.S. PATENT DOCUMENTS

| | | | | |
|---|---|---|---|---|
| 2018/0365686 A1* | 12/2018 | Kondo | ............... | H04L 63/123 |
| 2019/0057386 A1* | 2/2019 | Fazeli | ............... | G06Q 40/025 |
| 2019/0114334 A1* | 4/2019 | Gunther | ............ | G06F 16/2358 |
| 2019/0245697 A1* | 8/2019 | El Abed | ............ | H04L 63/0823 |
| 2019/0278689 A1* | 9/2019 | Perea | ............... | G06F 11/3466 |
| 2020/0244811 A1* | 7/2020 | Ramprasad | ........ | G06Q 30/0267 |
| 2020/0272619 A1* | 8/2020 | Alferov | ............... | G06Q 50/265 |
| 2020/0274765 A1* | 8/2020 | Dasgupta | ............ | H04L 61/2007 |
| 2020/0334772 A1* | 10/2020 | Gorodeisky | ............ | G06N 3/08 |
| 2020/0349556 A1* | 11/2020 | Yao | .................... | G06Q 20/223 |

\* cited by examiner

PARTNER 1

Dashboard    Accounts    Invoices    Tax Exemption    Claims

Administrator1 ∨

Wholesale Claim
Powered by Blockchain

Claims List > Claim Details

Claim ID
212X012047783

State
212X012047783

Batch ID
CL-72-VZ

Claim Amount
$ 2,082.64

Amount Withheld
$ 9.64

Bill Date
02/21/2019

Claim Type
TAX 03

Claim Description

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

Batch Info

Batch ID :                    CL-72-VZ
Partner :                     SamplePartner
Status :                      Acknowledged
Uploaded Timestamp :  2018/02/23 11:58:59

Contact :    Name2
Phone :      9072340234
Email :       Name2@provider.com

Invoice Details

Surcharge   GROSS RECEIPTS TAX-CABLE
State :                NY           Monthly Charge :       $ 20.22
Legal Entity :     CRISNE Surcharge   GROSS RECEIPTS TAX-CABLE
State :                NY           Monthly Charge :       $ 20.22
Legal Entity :     CRISNE Surcharge   GROSS RECEIPTS TAX-CABLE
State :                NY           Monthly Charge :       $ 20.22
Legal Entity :     CRISNE Surcharge   GROSS RECEIPTS TAX-CABLE
State :                NY           Monthly Charge :       $ 20.22
Legal Entity :     CRISNE Show Blockchain Transaction History ∨

PARTNER 1 Wholesale Claim
Powered by Blockchain

Dashboard    Accounts    Invoices    Tax Exemptions    Claims

Claims List > Batch Detail

| | | |
|---|---|---|
| Batch ID | Status | Batch .xsl File |
| CL-72-VZ | Acknowledged | Upload Timestamp |
| Name | Contact | 2008/02/03 22:22:59 |
| Sample | Name2 | Retrieve .xls File of this Claim Batch ⬇ |
| Phone | Email | |
| 917-882-1234 | Name2@provider.com | |

Batch Summary

Batch didn't pass basic validation.
Please Check Errors

Basic Claim File Validation: Failed                                    4 Errors

● Row 12        Claim is not a Tax Claim. Check Claim Type.

● Row 203       Cannot match BAN to Account Data in System. Check BAN on Claim Line is on Account Asset.

● Row 1,842     Claim is duplicate. Check that claim has not already be loaded.

● Row 23,419    Cannot match BAN to Invoice Data in System. Check that Claim is for an Invoice Asset.

Hide Blockchain Transaction History ∧

| BAN ∨ | Update Type ∨ | Previous Value ∨ | New Value ∨ | Transaction ID ∨ | Time Stamp ∨ |
|---|---|---|---|---|---|
| 736985424 | Create | NA | NA | hashditrcosxxm123ashktoadfindjsahd59 1dphnasjkMou1q080cposhd | 2019-02-15 11:30:32 03 |

# SYSTEM AND METHOD FOR CARRIER SETTLEMENT USING BLOCKCHAIN

BACKGROUND

A telecommunications carrier may provide telecommunication services under its own company or brand name, while actually using the equipment and facilities of another telecommunications carrier to provide those services. For example, one carrier may purchase "wholesale" telecommunications services from another telecommunications carrier and resell such services to its retail customers. Such arrangements may be used to support coverage gaps in different telecommunications networks. The telecommunications carrier that owns the equipment may be referred to as a wholesale vendor or provider, and the telecommunications carrier that provides retail services using the wholesale vendor's network may be referred to as a reseller.

In some arrangements, a wholesale vendor may bill the reseller for actual services used by the reseller's retail customers. Additionally, a reseller that purchases telecommunications services for resale may be required to collect taxes from its retail customers on the sales price that it charges those retail customers for the telecommunications services. Billing disputes may arise from such transactions, and resolution of such disputes can be time consuming and increase overhead costs for both wholesale vendors and resellers.

BRIEF DESCRIPTION OF THE DRAWINGS

FIGS. 9A, 9B, and 10 are illustrations of user interfaces that may be presented by the decentralized application of FIG. 5.

DETAILED DESCRIPTION OF THE PREFERRED EMBODIMENTS

Figure 1:
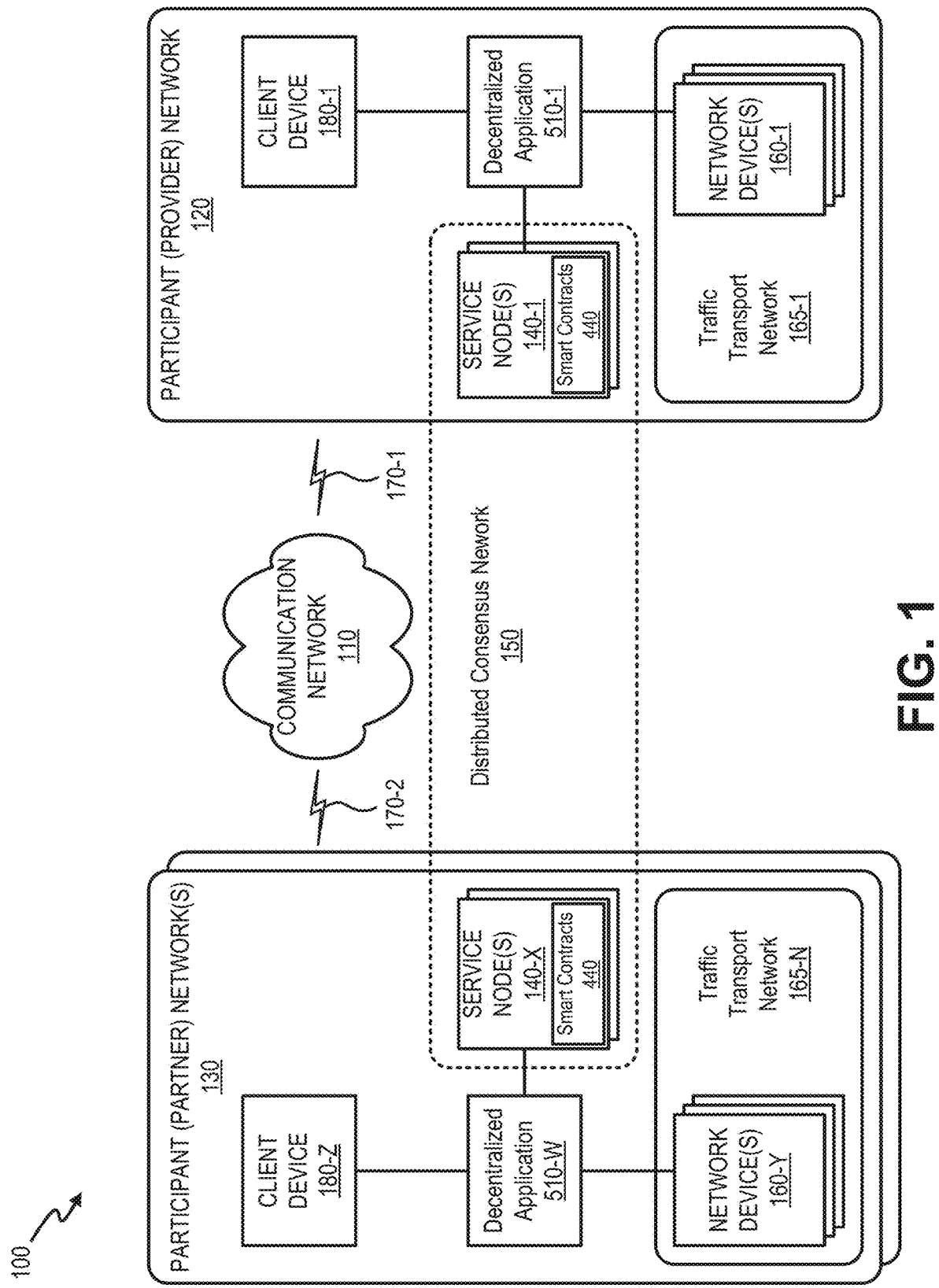
FIG. 1 is a diagram that depicts an exemplary network environment in which systems and methods described herein may be implemented.

The following detailed description refers to the accompanying drawings. The same reference numbers in different drawings may identify the same or similar elements.

Implementations described herein provide a framework for providing billing reconciliation management for wholesale telecommunications claims between two or more telecommunications network providers using a consensus network (also referred to herein as a blockchain network). Transaction data and baseline rules for wholesale customers are shared among participants (e.g., wholesale vendors and resellers) in a consensus-based immutable and distributed ledger (e.g., a blockchain ledger) that is shared among the participants. Claims, such as reseller's claims that may arise in response to a wholesale vendor's invoice, may be submitted for resolution through a decentralized application framework that utilizes the consensus network.

The decentralized application framework may provide a self-owned user interface for participants to create claims, upload data to the distributed ledgers, download data from the distributed ledgers, view claims/data, and search claims/data. The decentralized application may solicit structured user input for claim submissions (e.g., including a bill number, a bill amount, a claim amount, and a claim type). The decentralized application may utilize a series of application programming interface (API) calls to implement such features. Incoming claim submissions may be automatically reviewed and validated for accuracy.

A "smart" contract, implemented through the consensus network, between the wholesale vendors and reseller may govern the resolution of each claim. The smart contract includes computer code, on top of a blockchain, that implements a set of rules. The smart contract may apply invoice details, tax certificate details, account details, bill data tape (BDT) details, exemption details, etc., based on the validated claim submission. The smart contract may determine if a claim is valid or invalid. If a claim is found to be valid, the systems described herein may automatically adjust a bill amount and update the wholesale vendor's billing system. If a claim is found to be invalid, the claim may be rejected and the claim status updated in the distributed ledger. Unresolved claims may be redirected for manual resolution.

Systems and methods described herein encourage increased trust between participants through use of an immutable distributed ledger of transactions. The systems and methods also provide for a robust claim pre-validation through smart contracts, which results in fewer invalid claims. Automated claim analysis described herein expedites claim resolutions (e.g., in near real time). Shared visibility and inherent linking of related contract, tariff, ordering, provisioning, billing, payment, tax exemption and other data assets associated with wholesale telecommunications service using the immutable distributed ledger of transactions may result in less claim duplication, less reconciliation and may also reduce instances of manual claim resolutions. The systems and methods may result in an overall reduction in settlement-related costs for wholesale telecommunications claims.

FIG. 1 is a diagram illustrating an exemplary network environment 100 in which systems and methods described herein may be implemented. As illustrated, environment 100 may include a communication network 110, a participant network 120 associated with a provider of telecommunications services (also referred to as a "provider network"), one or more participant networks 130 associated with resellers of telecommunications services provided by the provider network (also referred to as a "partner network"), service nodes 140-1 through 140-X (also referred to as collectively as "service nodes 140" and, individually or generically as "service node 140") in a distributed consensus network 150, network devices 160-1 through 160-Y (also referred to collectively as "network devices 160" and, individually or generically as "network device 160"), traffic transport networks 165-1 through 165-N (also referred to collectively as "traffic transport networks 165" and, individually or generically as "traffic transport network 165"), and client devices 180-1 through 180-Z (also referred to as collectively as "client devices 180" and, individually or generically as "client device 180").

Communication network 110, provider network 120, reseller network 130, service nodes 140, distributed consensus network 150, network devices 160, traffic transport networks 165, and client devices 180 may include one or more network elements or be combined within one or more network elements. A network element may be implemented according to a centralized computing architecture, a distributed computing architecture, or a cloud computing architecture (e.g., an elastic cloud, a private cloud, a public cloud, a virtual cloud etc.). Additionally, a network element may be implemented according to one or multiple network architectures (e.g., a client device, a server device, a peer device, a proxy device, and/or a cloud device).

As further illustrated, environment 100 includes communication links 170 between the network elements and networks (although only three are illustrated in FIG. 1 as links 170-1, 170-2, and 170-3). A network element may transmit and receive data via a link 170. For example, the service node(s) 140 of reseller network 130 and the services node(s) 140 of provider network 120 may communicate with each other using links 170. Environment 100 may be implemented to include wireless and/or wired (e.g., electrical, optical, etc.) links 170. A communication link between network elements may be direct or indirect. For example, an indirect communication link may involve an intermediary device or network element, and/or an intermediary network not illustrated in FIG. 1. According to one implementation, links 170 may be implemented as virtual private network (VPN) links. Additionally, the number, the type (e.g., wired, wireless, etc.), and the arrangement of links 170 illustrated in environment 100 are exemplary.

Communication network 110 may include one or multiple networks of one or multiple types. For example, communication network 110 may include a terrestrial network, a satellite network, a wireless network, and/or a wired network. In some implementations, communication network 110 may incorporate other networks, such as the Internet, a core network, or a backhaul network.

Provider network 120 includes one or multiple traffic transport networks 165-1 of one or multiple types that are capable of receiving and transmitting data, voice and/or video signals as part of the telecommunications services it provides to customers. For example, traffic transport networks 165-1 may include one or more public switched telephone networks (PSTNs) or other type of switched network. Traffic transport networks 165-1 may also include one or more wireless networks and may include a number of wireless stations for receiving wireless signals and forwarding the wireless signals toward the intended destination. Traffic transport networks 165-1 may further include one or more satellite networks, one or more packet switched networks, such as an Internet protocol (IP) based network, a software defined network (SDN), a local area network (LAN), a WiFi network, a wide area network (WAN), a long term evolution (LTE) network, a fourth generation (4G) network, a 4G LTE Advanced network, a fifth generation (5G) network, an intranet, the Internet, or another type of network that is capable of transmitting data. Some or all of traffic transport networks 165-1 may include a private domain or virtual private cloud. Traffic transport networks 165-1 may provide packet-switched services and wireless Internet protocol (IP) connectivity to user devices to provide, for example, data, voice, and/or multimedia services during communication sessions.

Partner network 130 may include similar elements as provider network 120 described above. For example, partner network 130 may include one or multiple traffic transport networks 165-N that include one or more wired, wireless and/or optical networks that are capable of receiving and transmitting data, voice and/or video signals. Traffic transport networks 165-N may also include one or more wireless networks which may include a number of wireless stations for receiving wireless signals and forwarding the wireless signals toward the intended destination, one or more satellite networks, one or more packet switched networks, such as an IP based network, a LAN, a WiFi network, a WAN, an LTE network, a 4G network, a 4G LTE Advanced network, a 5G network, an intranet, the Internet, or another type of network that is capable of transmitting data. Some or all of traffic transport networks 165-N may include a private domain or virtual private cloud. Traffic transport networks 165-N may also provide wireless packet-switched services and wireless IP connectivity to user devices to provide, for example, data, voice, and/or multimedia services.

Partner network 130 may be associated with a different service provider than provider network 120. For example, networks 120 and 130 may operate as partner networks in which the different service providers have established mutually agreed upon parameters for the provider network 120 to provide wholesale telecommunications services using traffic transport network 165-1 for use by customers of the partner network 130, or vice versa, as described below.

As illustrated in FIG. 1, according to an exemplary embodiment, provider network 120 and partner network 130 each includes one or more service nodes 140. Service node 140 may include one or more network devices that provide storage and/or computing resources for supporting blockchain-based wholesale billing reconciliation. In one implementation, for example, service node 140 may be implemented as a virtual machine and scaled to accommodate different levels of activity. Each service node 140 may be included, for example, within a private domain of either provider network 120 or partner network 130. According to an implementation described further herein, each service node 140 may compile and validate a distributed ledger of wholesale transactions, previous claims, and partner information assets which may be used to create, search, and automatically resolve new claims generated, for example, using decentralized applications 510 further described below.

Distributed consensus network 150 (also referred to as a peer-to-peer network) may include network devices that participate in blockchain-based technologies, including validation of distributed ledger entries. In one implementation, distributed consensus network 150 may include some or all of service nodes 140. In another implementation, distributed consensus network 150 may include nodes (not shown) other than service nodes 140. For example, according to another implementation, multiple servers or proxy nodes running in cloud or edge compute clusters/farms can be leveraged as a consensus network to reduce a burden on service nodes 140. Alternatively, distributed consensus network 150 may include service nodes 140 in different private domains. According to implementations described herein, distributed consensus network 150 may be a permissioned, private network. Thus, service nodes 140 may join distributed consensus network 150 only through an invitation from provider network 120. Invited participants may be provided with credentials through which service nodes (e.g., service nodes 140-X) can access particular channels within distributed consensus network 150 (as described further herein).

Each participating node in distributed consensus network 150 maintains a continuously-growing list of records referred to herein as a "distributed ledger," which may be associated with wholesale transactions between particular participants (e.g., provider network 120, partner network 130) and which is secured from tampering and revision. Any validated updates from a trusted node will be added into the distributed ledger. Each version of the distributed ledger contains a timestamp and a link to a previous version of the distributed ledger. Updates are added in chronological order to the distributed ledger, and the distributed ledger is presented to each of participating service nodes 140 in distributed consensus network 150 as a cryptographically secured block. Each piece of data in the distributed ledger may be considered as a hash value (i.e., unique signature of the original data) in a hash tree structure for efficiency. This hash tree ensures that blocks received from the trusted node are received undamaged and unaltered, and enables distributed consensus network 150 to check that the other nodes in distributed consensus network 150 do not have fraudulent or inaccurate blocks in the distributed ledger. Distributed consensus network 150 may be implemented using one or more blockchain frameworks, such as Hyperledger Fabric.

Network device 160 may include a device configured to perform networking functions in traffic transport networks 165. For example, network devices 160 may include switches, routers, firewalls, gateways, Reconfigurable Optical Add-Drop Multiplexers (ROADMs), wireless access stations (e.g., a base station, an evolved NodeB, a next-generation NodeB, etc.), gateway devices (e.g., serving gateways (SGWs) or PDN gateways (PGWs)), support nodes, serving nodes, mobility management entities (MMEs), s core access and mobility management functions (AMFs), session management functions (SMFs), policy control functions (PCFs), policy charging rules functions (PCRFs), Network Data Analytics Functions (NWDAFs), as well other network devices that provide various network-related functions and/or services, such as charging and billing, security, authentication and authorization, network policy enforcement, management of subscriber profiles, and/or other functions and/or services that facilitate the operation of a network. Some or all of the functionality of network devices 160 may be virtualized as virtual network functions (VNFs) executing on computing equipment allocated to a traffic transport network 165. Among other capabilities, network devices 160-1 in traffic transport networks 165-1 may enable and support wholesale services that are provided to partner network 130 by provider network 120.

Client device 180 may include a connected device or computing device operated by a user or on behalf of a user. Client device 180 may request items or services, which require blockchain services, from one or more of network devices 160 or service nodes 140. According to one implementation, client device 180 may include or access a decentralized application (dApp) that may be used to generate, submit, and/or review a claim and/or other related assets on the blockchain (e.g. Tax Exemption forms). For example, client device 180 in partner network 130 may submit a claim to reconcile an invoice for wholesale services associated with provider network 120. The client device 180 (using the dApp 510) may use, for example, an API call for the particular type of claim. The API call may, for example, cause a new claim request to be created into the distributed ledger for distributed consensus network 150.

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple partner networks 130 that participate in environment 100 and perhaps use wholesale services provided by provider network 120. Additionally, or alternatively, according to other embodiments, multiple network elements may be implemented on a single device, and conversely, a network element may be implemented on multiple devices. For example, all or portions of service nodes 140 may be included within a network devices 160. In other embodiments, one network in environment 100 may be combined with another network. In other embodiments, the roles of participant networks 120/130 may be interchangeable, such that participant networks 130 may sometimes act as a provider network (e.g., a wholesale vendor) and participant networks 120 may act as a partner network (e.g., a reseller).

Figure 2:
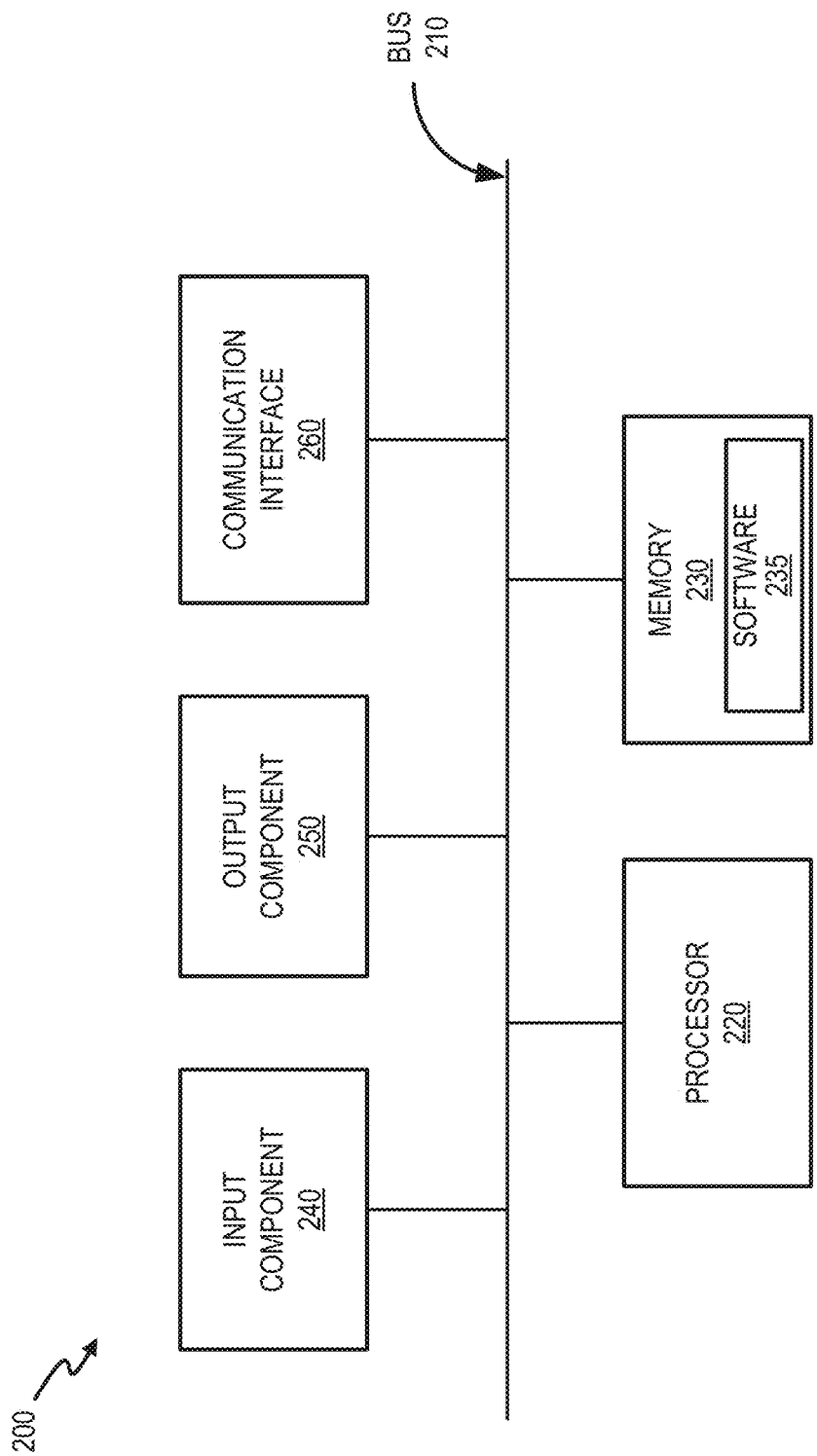
FIG. 2 is a diagram illustrating exemplary components of a device that may correspond to the network elements and client devices depicted in the environment of FIG. 1.

FIG. 2 is a diagram illustrating exemplary physical components of a device 200. Device 200 may correspond to each of the network elements of FIG. 1, including devices in communication network 110, provider network 120, partner network 130, and distributed consensus network 150; service nodes 140, network devices 160, and client devices 180. Device 200 may include a bus 210, a processor 220, a memory 230 with software 235, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 may also include firmware, middleware, microcode, hardware description language (HDL), and/or other form of instruction. By way of example, with respect to the network elements that include logic to provide blockchain services, these network elements may be implemented to include software 235. Additionally, for example, client device 180 may include software 235 (e.g., an application to communicate with service node 140, network devices 160, etc.) to perform tasks as described herein.

Input component 240 may include a mechanism that permits a person to input information to device 200, such as a keyboard, a keypad, a button, a switch, etc. Output component 250 may include a mechanism that outputs information to the person, such as a display, a speaker, one or more light emitting diodes (LEDs), a liquid crystal display (LCD), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. As another example, device 200 may include one or more switch fabrics instead of, or in addition to, bus 210. Additionally, or alternatively, one or more components of device 200 may perform one or more tasks described as being performed by one or more other components of device 200.

Figure 3:
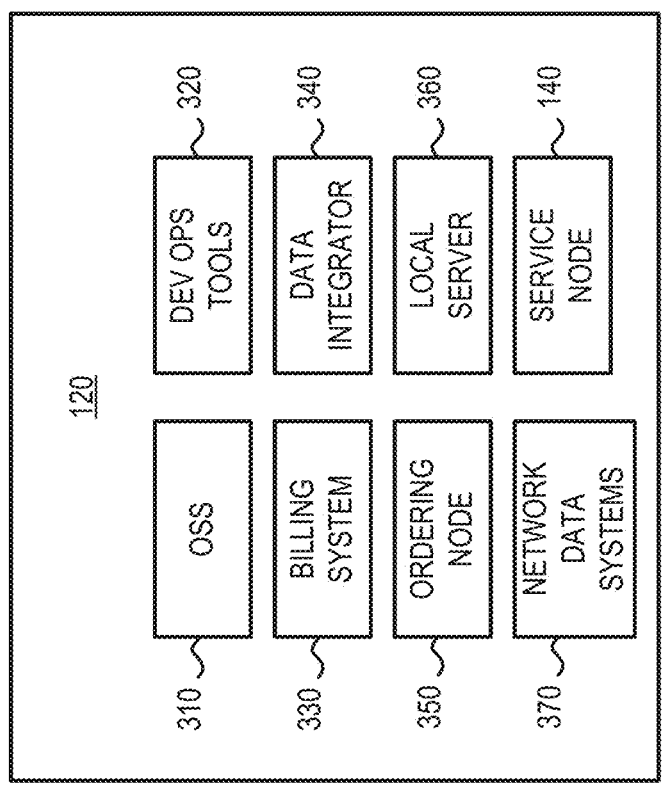
FIG. 3 is a diagram illustrating exemplary systems of the provider network of FIG. 1, according to an implementation described herein.

FIG. 3 is a block diagram illustrating exemplary systems of provider network 120. As shown in FIG. 3, provider network 120 may include an operational support system (OSS) 310, development operations (dev ops) tools 320, a billing system 330, a data integrator 340, an ordering node 350, a local application server 360, network data systems 370, and service node 140. Each of OSS 310, development operations tools 320, billing system 330, data integrator 340, ordering node 350, and local application server 360 may be implemented as one or more network device 160 or as one or more logical components within a network device 160.

OSS 310 may include one or more computer devices and systems associated with provider network 120. For example, OSS 310 may include backend applications/systems for managing network 120, including identifying subscribers of partner network 130, tracking subscribers, logging subscriber usage, reporting performance data and messages associated with inter-service provider communication sessions, etc. According to one implementation, OSS 310 may collect usage information from a session management function or gateway associated with traffic transport networks 165-1. OSS 310 may also include or communicate with a charging function that performs charging and/or billing for traffic transport networks 165-1. OSS 310 may identify (or indicate) data for partner subscribers that can be incorporated into distributed consensus network 150 (e.g., distributed ledger 430 of each service node 140, described below).

Development operations tools 320 may provide software modules, templates, services, and the like for developers to create and monitor micro-services. Development operations tools 320 may include, for example, service node health monitors, blockchain micro-service health monitors (e.g., per service/per instance), smart contract validators, aggregate prediction schedulers, chain analyzers, anti-collusion analyzers, kernel analyzers, log analyzers, memory analyzer, input/output (I/O) usage monitors, vulnerability detectors, sizing calculators, support helpers, platform sizing tools, statistics gathering tools, configuration management tools, etc. According to one implementation, development operations tools 320 may include a software development kit (SDK) for use by developers to create a decentralized application (e.g., decentralized application 510, described below). Development operations tools 320 may include resources for generating, testing, and approving a smart contract (e.g., smart contract 440 described below). For example, development operations tools 320 may include a software template, scripts, and test platform that may be used by network administrators and/or programmers to generate a smart contract that automatically verifies and enforces terms between a wholesale vendor (e.g., associated with provider network 120) and a reseller (e.g., associated with partner network 130).

Billing system 330 may include one or more computer devices and systems associated with provider network 120 that manage customer billing for service provided to partner network 130. For example, billing system 330 may generate invoices to be provided to resellers (e.g., a service provider associated with partner network 130) based on actual services used by the reseller's retail customers. In one implementation, billing system 330 may generate invoices periodically (e.g., monthly). Invoices may be distributed to resellers, and, where items of an invoice are in dispute or need correction, claims may be generated by administrators of partner network 130 (e.g., using dApp 510 described below) to address billing disputes regarding wholesale telecommunications services.

Data integrator 340 may include one or more computer devices and systems associated with provider network 120 that retrieve data from OSS 310 and/or other data stores. Data integrator 340 may upload data to distributed consensus network 150, such as invoices, accounts, tax certificates, bill data tape details, tax exemptions, and the like, that are related to wholesale services provided to partner network 130 and its subscribers. Data integrator 340 may interface with a carrier access billing system (CABS), a receivable management system (RMS), a customer records system, an enterprise records system, or other data storage systems that store data for provider network 120 (all represented collectively in FIG. 3 as network data systems 370) to obtain data for distributed consensus network 150. According to an implementation, each network data system 370 may use APIs or other structured interfaces to automatically forward records to data integrator 340. A different API, for example, may be used for different types of records (e.g., invoices, receivables, claims, certifications, etc.). A network data system 370 may forward entries in real-time (e.g., sending a copy to data integrator 340 as each entry is generated). Alternatively, a network data system 370 may periodically upload a batch of data to data integrator 340. Data integrator 340 may sort/group received records by partner, for example, so that records for each partner may be accessible through restricted channels, as described further below.

Ordering node 350 may include one or more computer devices and systems associated with provider network 120 that perform and ordering function for updates to a distributed ledger in distributed consensus network 150. Ordering node 350 may package proposed ledger updates that are received from service nodes 140 to, for example, avoid forks (or branches) in the distributed ledger. Ordering node 350 may collect proposed transaction updates, order them, and package them into blocks for distribution to all service nodes 140. Additionally, in another implementation, ordering node 350 may also maintain a list of entities that are allowed to create channels, as described further below.

Local application server 360 may include one or more computer devices to facilitate a decentralized application for use by client devices 180. Local application server 360 may solicit, receive, and process formatted claims from applications on client device 180. Local application server 360 may provide an interface between client device 180 and service node 140 to view data in distributed consensus network 150, submit claims, and conduct searches using, for example, APIs.

The systems shown in FIG. 3 are exemplary. According to other embodiments, provider network 120 may include additional systems, fewer systems, and/or different systems, than those illustrated in FIG. 3 to accomplish similar objectives. For example, one or more of OSS 310, development operations tools 320, billing system 330, or data integrator 340 may be combined with other systems within or outside of provider network 120 as part of one or more network devices. Also, in some implementations, the capabilities of ordering node 350 or local application server 360 may be incorporated into service nodes 140.

Figure 4:
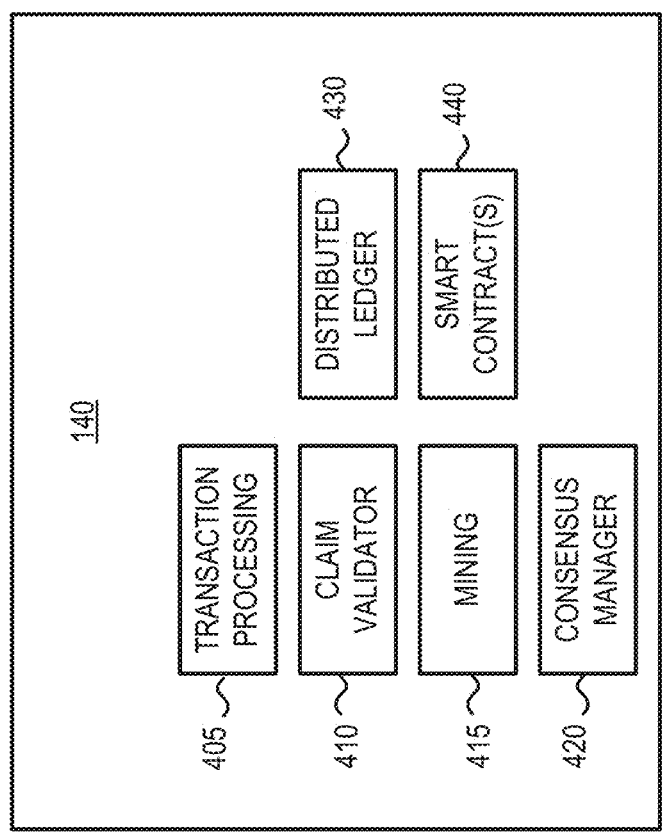
FIG. 4 is a diagram illustrating logical components a service node of FIG. 1.

FIG. 4 is a block diagram illustrating logical components of service node 140. Logical components of service node 140 may be implemented, for example, as a virtual machine or virtual function within provider network 120 or partner network 130. Service node 140 may integrate network data from provider network 120 and claims from partner network 130 into an immutable, secure, private, distributed ledger. For example, a service node 140 in provider network 120 may receive data related to network usage by retail customers of partner network 130. As another example, a service node 140 in partner network 130 may receive a new claim from a client device 180.

Service node 140 may include transaction processing unit 405, claim validator 410, mining unit 415, consensus manager 420, a distributed ledger 430, and one or more smart contracts 440. Each of the logical components shown in FIG. 4 may be included within a service node 140 (e.g., implemented as a single network device or a distributed node). According to the processes described below, information from network devices 160 and/or client devices 180 may be registered as a transaction in the distributed ledger 430 for distributed consensus network 150.

Transaction processing unit 405 at each active service node 140 in distributed consensus network 150 may gather a transaction queue. Claim validator 410 may review claims for format and field consistency to allow processing by a smart contract. For example, claim validator 410 may ensure entries in a claim are consistent with each other, invoice number, an invoice amount, a claim amount, and a claim type. In one implementation, claim validator 410 may prevent submission of a claim to distributed consensus network 150 until all fields are valid.

Mining unit 415 may perform blockchain mining operations (e.g., linking a new block to a cryptographic hash of a previous block, calculating a consensus algorithm for an incoming blocks, etc.) needed for verification and record-keeping. A first service node 140 that submits a proposed a new block may publish the answer (e.g., via ordering node 350) to the other service nodes 140. According to one implementation, each of the other service nodes 140 may confirm the new block (e.g., using mining unit 415), provide consensus (using consensus manager 420) to accept or reject the new block, and/or locally store the block in a distributed ledger 430. Consensus manager 420 may implement a consensus algorithm agreed to by the participants to determine how blocks are added to the distributed ledger. In some embodiments, the consensus algorithm may be a simple chronological ordering of all confirmed blocks based on a received timestamp (e.g., by the ordering node 350, one of the service nodes 140, or another system entity). Consensus manager 420 can also implement more complex consensus algorithms, such as proof-of-work, proof-of-stake, proof-of-authority, etc. In other implementations, as described further herein, at least some features of consensus manager 420 may be included within or coordinated via ordering node 350.

Distributed ledger 430 may store information that includes a continuously-growing list of records which is secured from tampering and revision. Each record (block) of the distributed ledger 430 may contain a timestamp and a link to a previous record (block) of distributed ledger 430. Records may be entered in chronological order to the distributed ledger 430 as a cryptographically secured block. Block security can include, depending on the implementation, signing all or part of the block contents and/or encrypting all or part of the block contents. Each entry of distributed ledger 430 may be considered as a hash value in a hash tree. This hash tree ensures that blocks received from service nodes 140 and/or ordering node 350 are received undamaged and unaltered, and enables service nodes 140 to ensure that other applications/devices do not add fraudulent or inaccurate blocks in distributed ledger 430. In one implementation, distributed ledger 430 may include information typically relevant to resolving wholesale telecommunications claims from a reseller (e.g., an owner of partner network 130) and/or validating billed services, service dates, applicable taxes, payments, etc. For example, information published to distributed ledger 430 may include invoices, account information, tax exemption data (e.g., certificates, regions, expirations, etc.), and manual claims (e.g., previous claims adjudicated outside of distributed consensus network 150) relating to partner network 130 or customers thereof.

Smart contracts 440 may include self-executing contracts with the terms of the wholesale agreement between provider network 120 and partner network 130 being directly written, for example, into lines of code. The code and the agreements contained therein may be incorporated across distributed consensus network 150. As described further herein, smart contracts 440 may include instructions for automatically adjudicating wholesale claims based on data published to distributed ledger 430.

Although FIG. 4 shows exemplary logical components of service node 140, in other implementations, a services node 140 may include fewer, more, or different logical components, and all service nodes 140 may not include an identical set of logical components.

Figure 5:
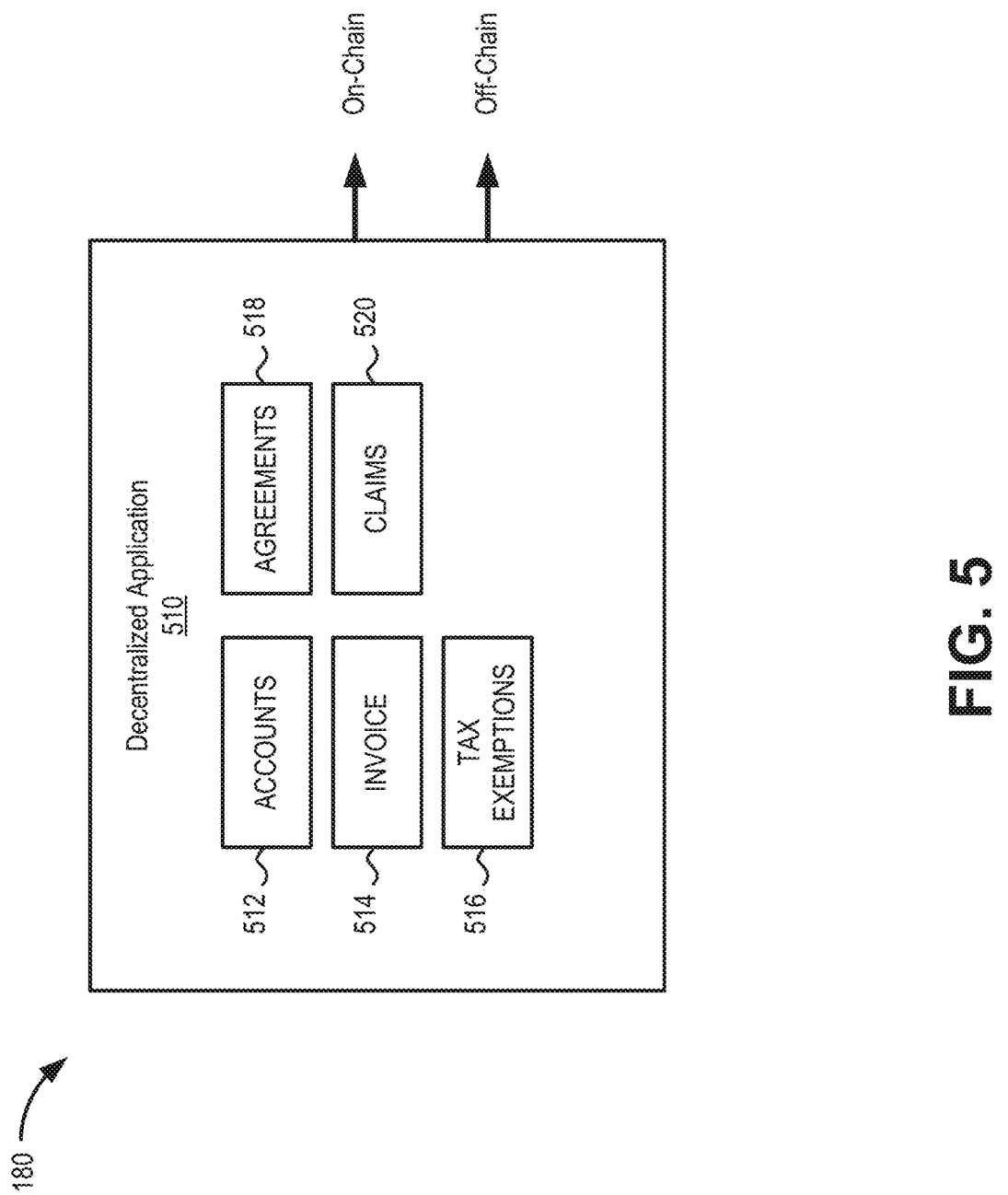
FIG. 5 is a block diagram illustrating logical components of a decentralized application.

FIG. 5 is a block diagram illustrating logical components of decentralized application 510. Decentralized application 510 may be implemented, for example, as software or a combination of software and hardware executed on client device 180. In one implementation, decentralized application 510 may be customized for either provider network 120 or partner network 130. For example, decentralized application 510 may be a derived from an application template and customized for use with provider network 120 or partner network 130.

Decentralized application 510 may provide a user interface to create, upload, download, view, and/or search claims and other data in distributed consensus network 150. For example, from partner network 130, decentralized application 510 may permit a user to create a claim, search for a claim, view a claim, and download data related to a claim. Alternatively, from provider network 120, decentralized application 510 may permit a user to search for a claim, view claim, and upload data related to a claim. Decentralized application 510 may include interfaces to "on-chain" data data stored in distributed ledger 430 in distributed consensus network 150 and "off-chain" data, such as data in provider network 120 or partner network 130. According to some implementations, decentralized application 510 may interface with local server 360 to perform tasks.

Decentralized application 510 may include interfaces to view authorized accounts 512, invoices 514, tax exemption data 516, partnership agreements 518, claims 520 and other authorized data. Decentralized application 510 may utilize, for example, a series of API calls (e.g., from APIs obtained via development operations tools 320) to interface with service node(s) 140 of distributed consensus network 150. In one implementation, the API calls may initiate chaincode that implements higher-level functionality on top of distributed ledger 430. The chaincode (which may include smart contracts 440) may be used by service node 140 to respond to requests from decentralized application 510. In one implementation, decentralized application 510 may solicit structured user input for claim submissions to ensure correct processing of the claim. For example, decentralized application 510 may solicit an invoice number, an invoice amount, a claim amount, and a claim type to ensure a unique claim/bill is addressed.

FIGS. 9A and 9B include an example of user interfaces 900 and 910, respectively, which may be presented via decentralized application 510. Structured input, such as drop down menus, radio buttons, lists, etc., may be provided in user interface 900 to submit new claims, search existing claims, and review other account information. Incoming claim submissions may be automatically reviewed and validated for accuracy (e.g., by claim validator 410 and/or smart contracts 440). As shown in user interface 910, submission errors may be detected prior to entry of a claim or batch of claims. For example, claim validator 410 may confirm that an invoice (or batch of invoices, i.e., "CL-72-VZ") identified in a claim includes the correct data fields for resolution as a selected claim type (i.e., "TAX 03") shown in user interface 900.

Figure 6:
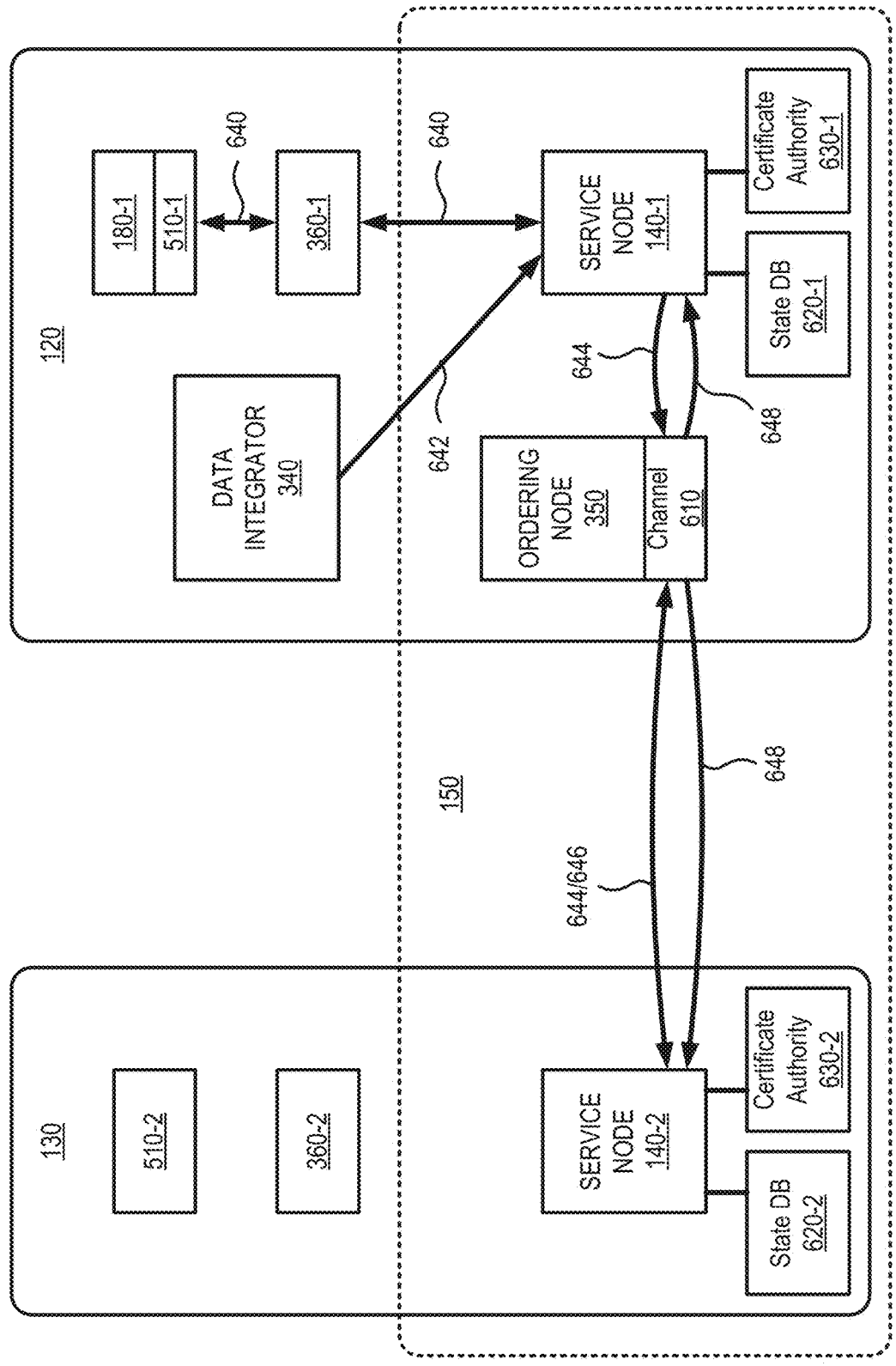
FIG. 6 is a diagram illustrating communications for provisioning a distributed consensus network for blockchain-based wholesale service reconciliation in a portion of the network environment of FIG. 1.

FIG. 6 is a diagram illustrating communications for provisioning a distributed consensus network for blockchain-based wholesale service reconciliation in a portion 600 of network environment 100. Network portion 600 may include parts of provider network 120 and partner network 130. Provider network 120 may include service node 140-1, data integrator 340, decentralized application 510-1, and local server 360-1. Partner network 130 may include service node 140-2, decentralized application 510-2, and local server 360-2.

As shown in FIG. 6, portions of provider network 120 and partner network 130 may form distributed consensus network 150. In the example configuration of FIG. 6, distributed consensus network 150 includes features of a Hyperledger Fabric, including ordering node 350, a channel 610, state databases 620, and certificate authorities 630. In other implementations, a different blockchain framework may be used. For example, in other implementations, ordering node 350 and/or channels 610 may not be used.

Referring to FIG. 6, a smart contract (e.g., smart contract 440) may be created to govern wholesale telecommunications claims between provider network 120 and partner network 130. The smart contract 440 may be provided to service node 140-1, for example, as chain code 640 through part of a single- or multi-node creation process so that all the nodes in distributed consensus network 150 share the same smart contract 440.

Still referring to FIG. 6, data integrator 340 may provide partner information assets 642 to service node 140-1 associated with provider network 120. Partner information assets 642 may include information typically relevant to resolving wholesale telecommunications claims from a reseller (e.g., a service provider associated with partner network 130). For example, partner information assets 642 may include invoices, account information, tax exemption data (e.g., certificates, regions, expirations, etc.), and manual claims (e.g., claims adjudicated outside of distributed consensus network 150) relating to partner network 130 or customers thereof. As described above, data integrator 340 may retrieve/obtain partner information assets 642 from multiple sources, such as various data collection systems in provider network 120. Partner information assets 642 may be provided to service node 140-1 periodically, in real-time, or as resources are available. In any event, partner information assets 642 may typically be provided before or simultaneously with wholesale service invoices that could generate claims from partner network 120.

Service node 140-1 may add partner information assets 642 to a distributed ledger (e.g., distributed ledger 430) for distributed consensus network 150. Partner information assets 642 may have different data structures for different types of assets (e.g., invoices, receivables, claims, documentation, etc.). The different types of assets may be conformed and/or accessed by smart contracts (e.g., smart contracts 440) to address different types of assets. For example, smart contracts may be made available for invoices, claims, tax certificates, account information, etc. Service node 140-1 may initiate a multi-phase exchange within distributed consensus network 150 to validate and update the distributed ledger with partner information assets 642. For example, service node 140-1 may be authenticated and authorized to conduct transactions with service node 140-2 over a particular channel 610, which may be verified by ordering node 350.

Service node 140-1 may generate a proposed ledger update 644 that includes partner information assets 642. Proposed ledger update 644 may be provided to service node 140-2 (e.g., mining unit 415) for an endorsement to the blockchain via channel 610. Service node 140-2 (as the endorsing node) may apply a local copy of the distributed ledger 430 to endorse proposed ledger update 644. Assuming service node 140-2 endorses proposed ledger update 644, service node 140-2 may not immediately apply the proposed ledger update to a local copy of the ledger after endorsement. Instead, service node 140-2 may return an approve proposal response 646 to ordering node 350 via channel 610. The endorsed, proposed ledger update may be ordered into blocks 648 by ordering node 350 and distributed to all peer nodes (e.g., service nodes 140-1 and 140-2) for final validation and ledger updates. If service node 140-2 is not able to endorse proposed ledger update 644 (e.g., in the instance of a hacking attempt or coding error), service node 140-2 may return a negative proposal response (not shown) to ordering node 350, and proposed ledger update 644 will not entered into distributed ledger 440.

Thus, partner information assets 642 for wholesale telecommunications may be loaded and shared across one secured permissioned blockchain network (e.g., distributed consensus network 150) that is available to both provider network 120 and partner network 130. As described further below, distributed ledger 430 and smart contract 440 may be applied by service nodes 140 to automatically adjudicate claims between provider network 120 and partner network 130.

According to an implementation, each service node 140 may employ a state database (DB) 620 to reduce search latencies within service node 140. For example, state database 620 may be used to store the most recent record from partner information assets 642 along with its associated blockchain identifier. Thus, in some instances, queries (e.g., originated by decentralized application 510) for the latest records can be addressed by state database 620 instead of searching through the entire distributed ledger 430.

According to another implementation, each service node 140 may also employ a certificate authority 630. Certificate authority 630 may provide certificate services to users of a distributed consensus network 150 relating to network participation, transactions invoked on the distributed ledger 430, and secured connections between users or components of the distributed ledger 430.

Figure 7:
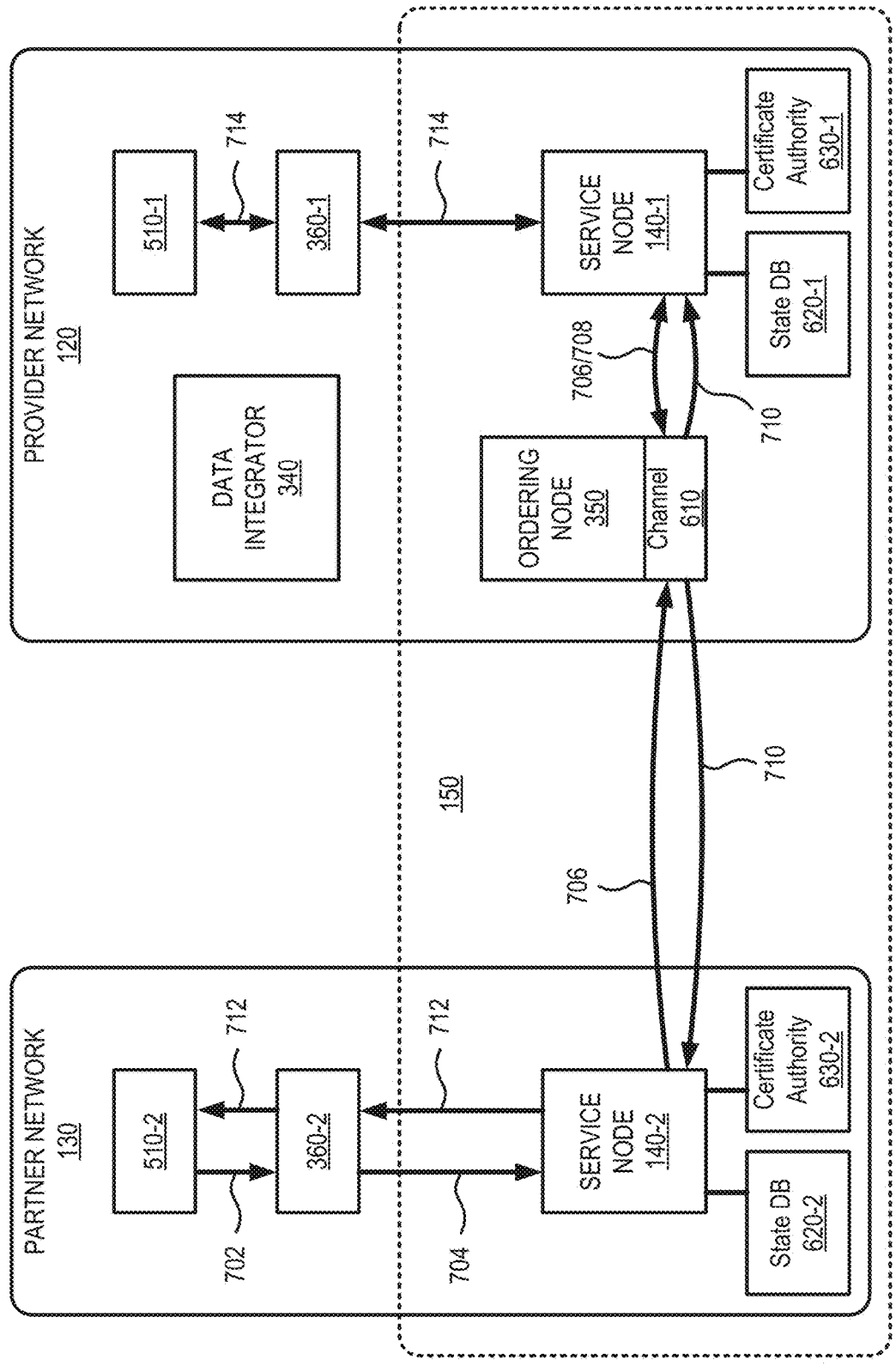
FIG. 7 is a diagram illustrating communications for a blockchain-based wholesale services reconciliation process in the network portion of FIG. 6.

FIG. 7 is a diagram illustrating communications for addressing a blockchain-based wholesale services reconciliation process in network portion 600 of network environment 100. Network portion 600 may include parts of provider network 120 and partner network 130. Provider network 120 may include service node 140-1, data aggregator 340, decentralized application 510-1, and local server 360-1. Partner network 130 may include service node 140-2, decentralized application 510-2, and local server 360-2.

Assume a reseller (e.g., a service provider associated with partner network 130) elects to dispute all or part of an invoice for wholesale services provided by provider network 120. As shown in FIG. 7, a user may use decentralized application 510-2 to initiate a wholesale claim request 702 via local server 360-2. For example, decentralized application 510-2 may solicit information from the user (e.g., an invoice number, an invoice amount, a claim amount, a claim type, etc.) and send claim request 702 to local server 360-2 via, for example, a Representational State Transfer (REST) API. Local server 360-2 may receive claim request 702 and forward the claim request to service node 140-2 as claim request 704 via, for example, a hypertext transfer protocol (HTTP) request.

Service node 140-2 may receive claim request 704. Service node 140-2 may apply the appropriate smart contract (e.g., smart contract 440) for the wholesale agreement between provider network 120 and partner network 130. Service node 140-2 may initiate a multi-phase exchange within distributed consensus network 150 to validate and adjudicate (e.g., approve or deny) claim request 704.

According to an implementation of the multi-phase exchange, service node 140-2 may be authenticated and authorized to conduct transactions with service node 140-1 over a particular channel 610, which may be verified by ordering node 350. Service node 140-2 may apply smart contract 440 and distributed ledger 430 to verify that the claim of claim request 704 is accurate (e.g., includes a valid invoice number, correct amounts, etc.) and to generate a proposed ledger update with an adjudicated result. The proposed ledger update 706 may be provided to service node 140-1 for an endorsement via channel 610. Service node 140-1 (as the endorsing node) may apply a local copy of the distributed ledger 430 and smart contract 440 to endorse proposed ledger update 706. Assuming service node 140-1 obtains the same result as proposed ledger update 706 (which would be expected except for instances of unauthorized access or coding errors), service node 140-1 may not immediately apply the proposed ledger update to a local copy of the ledger after endorsement. Instead, service node 140-1 may return a proposal response 708 to ordering node 350. The endorsed, proposed ledger update may be ordered into blocks by ordering node 350 and distributed to all peer nodes (e.g., service nodes 140-1 and 140-2) as adjudicated claim 710 for final validation and ledger updates.

Figure 10:
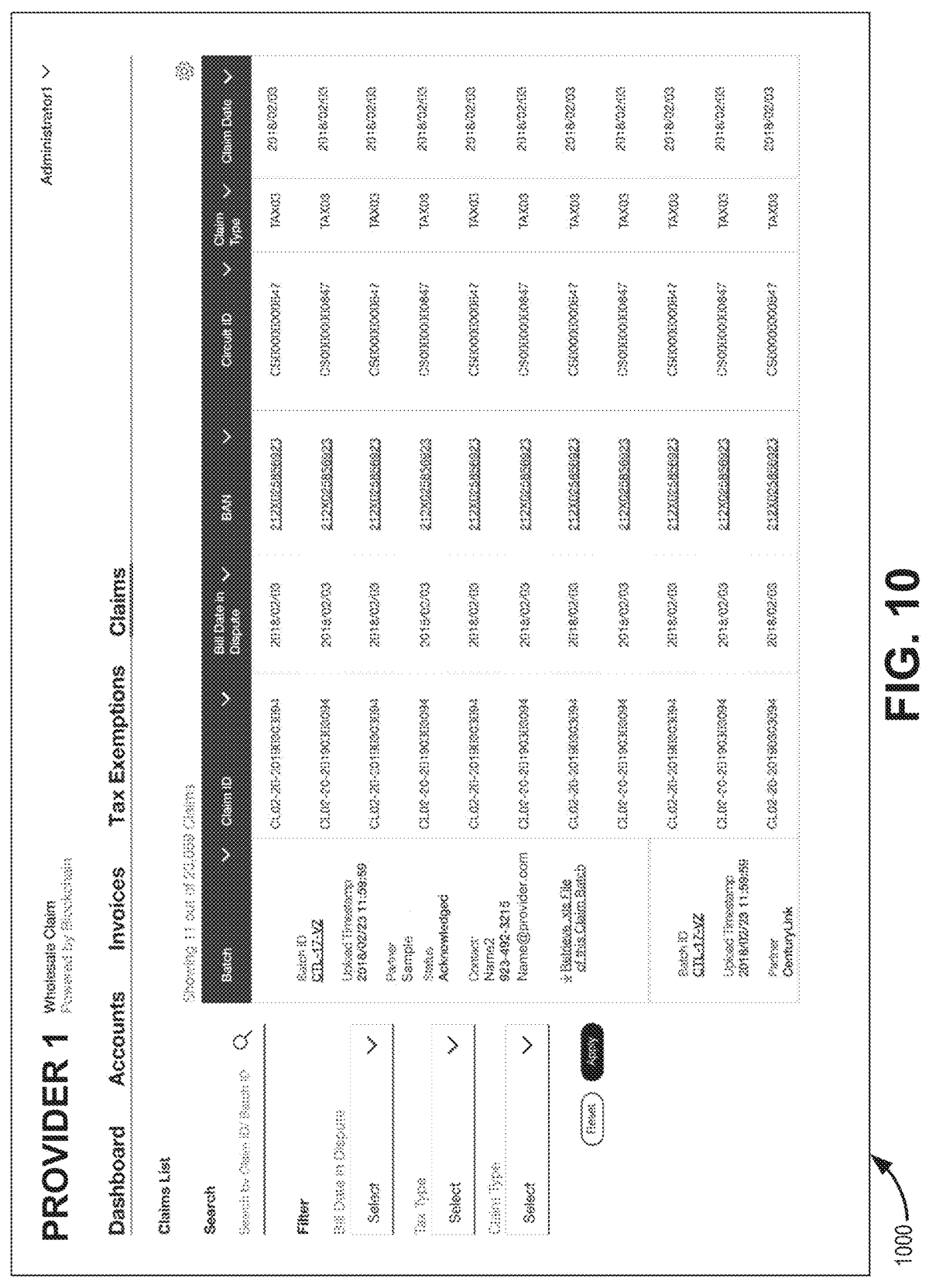

With adjudicated claim 710 added to the distributed ledger of distributed consensus network 150 (e.g., local stored in service node 140-1 and service node 140-2), administrators for provider network 120 and partner network 130 may use decentralized application 510 to view the results and supporting data. FIG. 10 includes an example of a user interface 1000 that may be presented via decentralized application 510. Structured input, such as drop down menus, radio buttons, lists, filters, search terms, etc., may be provided in user interface 1000 to search existing claims, sort claims, and review other account information.

For example, adjudicated claim 710 may be pushed 712 from service node 140-2 to decentralized application 510-2 via local server 360-2. Alternatively, decentralized application 510-2 may be used to request/view adjudicated claim 710. Similarly, adjudicated claim 710 may be provided 714 from service node 140-1 to decentralized application 510-1 via local server 360-1. According to another implementation, service node 140-1 may automatically initiate corrections (e.g., updated invoices, record adjustments, internal notices, etc.) for approved claims.

Figure 8:
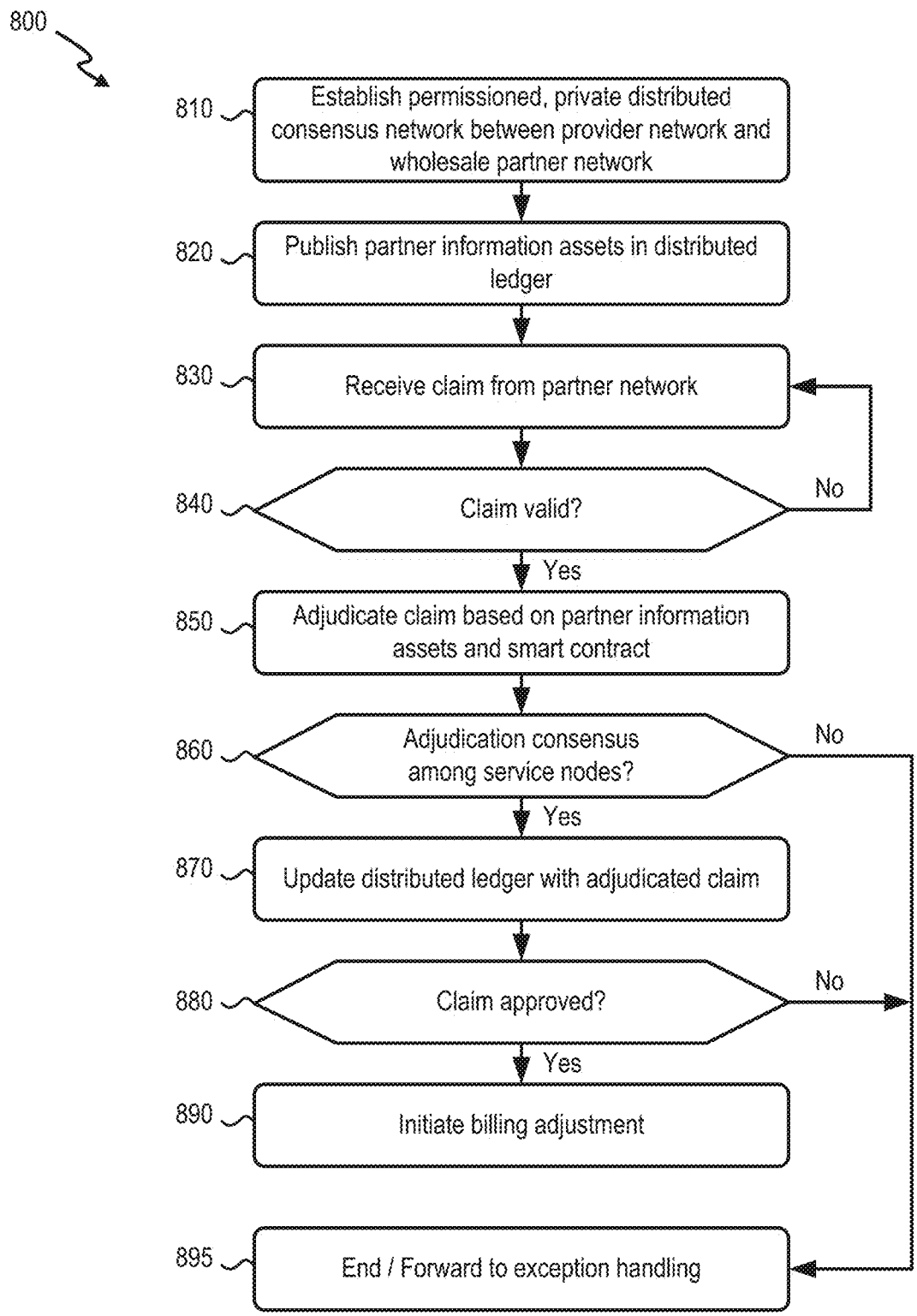
FIG. 8 is a flow diagram illustrating an exemplary process for implementing blockchain-based wholesale services claim management according to an implementation described herein.

FIG. 8 provides a flow diagram of an exemplary process 800 for implementing blockchain-based wholesale services claim management according to an implementation. In one implementation, process 800 may be performed by one or more service nodes 140 in distributed consensus network 150. In another implementation, some or all of process 800 may be performed by another device or group of devices, including or excluding devices in provider network 120 and/or partner network 130.

Process 800 may include establishing a permissioned, private distributed consensus network between devices in a provider network and a wholesale partner network (block 810), and publishing partner information assets in a distributed ledger (block 820). For example, provider network 120 and partner network 130 may be configured with respective service nodes 140 to support distributed consensus network 150. One or more smart contracts 440 may be included with each service node 140 to implement automated claim analysis. Partner network 130 may submit account data, documentations, and/or certifications in a structured format. For example, in the case of a wholesale telecommunications relationship, a reseller (using partner network 130) may provide an account identifier, certificates (e.g., for tax exemptions, etc.), an applicable state/region, certificate expirations date, tax exemption type, and a legal entity name. Provider network 120 (e.g., data integrator 340) may collect wholesale/reseller related data relevant to partner network 130 and submit the data to the distributed ledger (e.g., distributed ledger 430) as partner information assets 642.

Process 800 may also include receiving a claim from the partner network (block 830), and determining if the claim is valid (block 840). For example, a partner (e.g., an owner of partner network 130) may receive an invoice from a provider (e.g., an owner of provider network 120). An administrator may use decentralized application 510-2 to initiate a claim (e.g., wholesale claim request 702/704) to service node 140-2. Service node 140-2 (e.g., claim validator 410) may receive the claim and may determine if the claim is valid (e.g., includes a valid claim number, has an accurate bill/invoice number with corresponding billed amount and/ or tax amount, includes a claim type and claim amount, etc.) by comparing the information to information stored in distributed ledger 430.

If the claim is not valid (block 840—No), process 800 may return to block 830 to receive another claim. For example, service node 140-2 (e.g., claim validator 410) may determine there is a discrepancy in the wholesale claim request and request a revision. For instance, service node 140-2 (e.g., claim validator 410) may identify an inconsistency between fields of a claim, such as a claim type that is inconsistent with an invoice type. As another example, service node 140-2 may determine a claim is a duplicate of a previously submitted claim. As still another example, service node 140-2 may determine one of more fields of a claim cannot be matched to invoice data in distributed ledger 430. In another implementation (not shown in FIG. 8), an invalid wholesale claim request may be directed to an exception station of provider network 120 for review.

If the claim is valid (block 840—Yes), process 800 may include adjudicating the claim based on the partner information assets and a smart contract (block 850), and determining if there is an adjudication consensus among the service nodes (block 860). For example, service node 140-2 may initiate a multi-phase exchange within distributed consensus network 150 to approve or deny the claim request based on smart contract 440. In one implementation, the smart contract 440 may apply data in the claim to partner information assets (e.g., partner information assets 642) in distributed ledger 430 to automatically adjudicate (e.g., automatically approve or deny) the claim at each service node 140. For example, in the case of a reseller agreement, the smart contract 440 may apply usage data, tax rules, tax certificates, exemptions, and expiration dates from the reseller and billing records to verify an invoice. The claim adjudication may, as one example, identify missing or out-of-date tax documents, regulatory changes, or instances where a partner failed to provide updated information to the partner information assets in distributed ledger 430.

If there is an adjudication consensus among the service nodes (block 860—Yes), the distributed ledger may be updated with the adjudicated result (block 870), and it may be determined if the claim is approved (block 880). For example, if each participating service node 140 generates the same result (e.g., claim is denied or approved with a corrected invoice amount), a ledger update to distributed ledger 430 with the claim adjudication result may be distributed to service nodes 140 in distributed consensus network 150. The result (e.g., approved or denied) may be provided to other network device and/or administrator for provider network 120 and partner network 130.

If the claim is approved (block 880—Yes), process 800 may include initiating a billing adjustment (block 890). For example, upon receiving an indication of an approved claim, a service node or another network device 160 in provider network 120 may initiate creation of a new invoice for the amount of the approved claim. In other implementations, a service node or another network device 160 in provider network 120 may initiate creation of an adjustment to be posted on a subsequent invoice reflecting the amount of the approved claim. In still another implementation, a service node or another network device 160 in provider network 120 may initiate other systematic corrective actions to other ordering/provisioning systems on provider network 120, such as corrective orders, rate table updates, etc. In a further implementation, a service node 140 in a distributed consensus network 150 may solicit update certifications or tax-related documents to support the claim adjudication.

If there is not an adjudication consensus among the service nodes (block 860—No) or if the claim is not approved (block 880—No), process 800 may include exiting from the automated dispute resolution system (block 895). For example, the partner claim may be forwarded to an external system, such as an exception handling system, for review. In one implementation, a service node 140 may identify tax documents, regulatory codes, expired information, etc. in distributed ledger 430, if any, that cause a claim to not be approved.

As noted above, in other embodiments, systems and methods for implementing blockchain-based wholesale services claim management may include multiple resellers (e.g., multiple partner networks 130) working with a wholesale vendor (e.g., provider network 120). Provider network 120 may provide each partner network 130 with separate invitations/credentials for distributed consensus network 150. Claims transactions and asset information storage may be conducted through separate channels 610 reserved for each vendor/reseller relationship, using separate distributed ledgers 430. In some embodiments, multiple partner networks 130 working with a single provider network 120 may share a single channel 610 (and distributed ledger 430), with all or a portion of the information stored on the distributed ledger secured through encryption to avoid disclosure to other participants. The consensus algorithm of consensus manager 420 may take into account how much weight to allocate to service nodes 140 for participants who are not authorized to view information in proposed blocks.

In some embodiments a participant network (e.g., participant network 120/130) may be both a wholesale vendor and a reseller. For example, participant network 120 and participant network 130 may be included in a reciprocating agreement for telecommunication services. Reseller data and vendor data from the same participant network may be managed, for example, through separate channels and distributed ledgers. Thus, in a reciprocating arrangement between participant network 120 and participant network 130, participant network 120 may use one channel 610 between participant network 120 and participant network 130 to add partner assets, endorse claims, and review claims as a vendor of wholesale telecommunications services; and participant network 120 may use a different channel 610 to submit claims, update assets, and review claims as a reseller of wholesale telecommunications services provided by partner network 130.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, while examples described herein have been described in the context of a wholesale vendor/ reseller context, in other implementations, similar blockchain-based claim management processes may take place within other business contexts (e.g., a service provider/ enterprise relationship, etc.). Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software (e.g., software 235).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method, comprising:
    joining a first service node and a second service node in a private distributed consensus network, wherein the first service node includes a network device in a provider network that provides wholesale telecommunications services, and wherein the second service node includes a different network device in a partner network that utilizes the wholesale telecommunications services from the provider network, and wherein the first service node and the second service node are connected through a dedicated channel for the distributed consensus network;
    publishing, by the first service node and to a distributed ledger for the distributed consensus network, a smart contract, wherein the smart contract includes terms of a wholesale agreement between the provider network and partner network and instructions for automatically adjudicating wholesale claims;
    publishing, by the first service node and to the distributed ledger in real-time, partner information assets for the partner network;
    receiving, by the first service node and from the second service node, a claim request, wherein the provider network provides the wholesale telecommunications services to the partner network according to a wholesale agreement;
    validating, by the first device service node, the claim request based on information in the distributed ledger, wherein the distributed ledger includes transaction information generated by the provider network for the partner network under the wholesale agreement;
    adjudicating, by the first service node, the claim request based on information in the distributed ledger and instructions in the smart contract, wherein the adjudicating creates an adjudicated claim; and
    updating, by the first service node, the distributed ledger with the adjudicated claim, wherein the updating includes sending a proposed update of the distributed ledger to the second service node for endorsement.

2. The method of claim 1, wherein the transaction information includes invoices, account information, tax exemption data, and previous claims relating to use of the provider network by subscribers to the partner network.

3. The method of claim 1, wherein the proposed update of the distributed ledger includes a timestamp and a link to a previous transaction.

4. The method of claim 1, wherein the first service node and the second service node are participating service nodes in the distributed consensus network, and wherein the first service node is in a first private network and the second service node is in a different private network.

5. The method of claim 1, wherein the claim request includes an invoice number, an invoice amount, and a claim amount.

6. The method of claim 1, wherein the smart contract is a configured to accept the partner information assets with different data structures for different types of assets.

7. The method of claim 1, further comprising:
receiving, by the first service node, an endorsement of the adjudicated claim by the second service node.

8. The method of claim 1, further comprising:
receiving, by the second service node, an endorsement of the adjudicated claim by an ordering node in the distributed consensus network.

9. The method of claim 1, further comprising:
forwarding, by the second service node, the adjudicated claim to a decentralized application for the distributed consensus network.

10. The method of claim 1, further comprising:
initiating, by the first service node, a billing adjustment when the adjudicated claim indicates a claim approval.

11. A first service node comprising:
one or more processors configured to:
join a second service node in a private distributed consensus network, wherein the first service node includes a network device in a provider network that provides wholesale telecommunications services, and wherein the second service node includes a different network device in a partner network that utilizes the wholesale telecommunications services from the provider network, and wherein the first service node and the second service node are connected through a dedicated channel for the distributed consensus network;
publish, to a distributed ledger for the distributed consensus network, a smart contract, wherein the smart contract includes terms of a wholesale agreement between the provider network and partner network and instructions for automatically adjudicating wholesale claims;
publish, to the distributed ledger in real-time, partner information assets for the partner network;
receive a claim request, wherein the provider network provides the wholesale telecommunications services to the partner network according to a wholesale agreement;
validate the claim request based on information in the distributed ledger, wherein the distributed ledger includes transaction information generated by the provider network for the partner network under the wholesale agreement;
adjudicate the claim request based on information in the distributed ledger and instructions in the smart contract, wherein the adjudicating creates an adjudicated claim; and
update the distributed ledger with the adjudicated claim, wherein the updating includes sending a proposed update of the distributed ledger to the second service node for endorsement.

12. The first service node of claim 11, wherein the transaction information includes invoices, account information, tax exemption data, and previous claims relating to use of the provider network by subscribers to the partner network.

13. The first service node of claim 11, wherein, when validating the claim request, the one or more processors are further configured to:
compare an invoice number and an invoice amount in the telecommunication claim with information in a distributed ledger.

14. The first service node of claim 11, wherein the first service node is in the distributed consensus network.

15. The first service node of claim 11, wherein the smart contract is configured to accept the partner information assets with different data structures for different types of assets.

16. The first service node of claim 15, wherein the one or more processors are further configured to:
receive an endorsement of the adjudicated claim from another service node in a private domain associated with the provider network.

17. A non-transitory computer-readable medium containing instructions executable by at least one processor of a first service node, the computer-readable medium comprising one or more instructions to:
join a second service node in a private distributed consensus network, wherein the first service node includes a network device in a provider network that provides wholesale telecommunications services, and wherein the second service node includes a different network device in a partner network that utilizes the wholesale telecommunications services from the provider network, and wherein the first service node and the second service node are connected through a dedicated channel for the distributed consensus network;
publish, to a distributed ledger for the distributed consensus network, a smart contract, wherein the smart contract includes terms of a wholesale agreement between the provider network and partner network and instructions for automatically adjudicating wholesale claims;
publish, to the distributed ledger in real-time, partner information assets for the partner network;
receive a claim request, wherein the the provider network provides the wholesale telecommunications services to the partner network according to a wholesale agreement;
validate the claim request based on information in the distributed ledger, wherein the distributed ledger includes transaction information generated by the provider network for the partner network under the wholesale agreement;
adjudicate the claim request based on information in the distributed ledger and instructions in the smart contract, wherein the adjudicating creates an adjudicated claim; and
update the distributed ledger with the adjudicated claim, wherein the updating includes sending a proposed update of the distributed ledger to the second service node for endorsement.

18. The non-transitory computer-readable medium of claim 17, further comprising one or more instructions to:
store a local copy of the smart contract and the distributed ledger.

19. The non-transitory computer-readable medium of claim 17, further comprising one or more instructions to:
forward the adjudicated claim to a decentralized application for the distributed consensus network.

20. The non-transitory computer-readable medium of claim 17, further comprising one or more instructions to:
initiate a billing adjustment when the adjudicated claim indicates a claim approval.

* * * * *